Patented Feb. 15, 1938

2,108,782

UNITED STATES PATENT OFFICE 2,108,782

VULCANIZATION OF RUBBER

Robert L. Sibley, Nitro, W. Va., assignor, by mesne assignments, to Monsanto Chemical Company, St. Louis, Mo., a corporation of Delaware No Drawing. Application November 23, 1935, Serial No. 51,333

10 Claims. (Cl. 18—53)

The present invention relates to the vulcanization of rubber by an improved process wherein there is employed a guanidine salt of an aromatic sulfonic acid in conjunction with an accelerator of a different class and forming therewith a mixed accelerator.

Preferably the guanidine salts of aromatic sulfonic acids of the present invention are employed in conjunction with thiazole accelerators. However, other than thiazole accelerators may be employed in conjunction with guanidine salts of aromatic sulfonic acids. Thus, the aldehyde-amine accelerators, the thiuramsulfides, the dithio carbamates and the xanthates may be so employed.

Included within the scope of the guanidine salts of the present invention are diphenyl guanidine p-toluene sulfonate, diphenyl guanidine benzene sulfonate, diortho tolyl guanidine benzene sulfonate, diortho tolyl guanidine p-toluene sulfonate, diphenyl guanidine 4-amino benzene sulfonate, diphenyl guanidine thymol sulfonate and diphenyl guanidine 4-nitro chlor benzene-2-sulfonate and analogues and equivalents thereof.

Thus, in place of the guanidine bases set forth above, I may react dianisidyl guanidine, diphenetidyl-guanidine, phenyl-p-piperidyl phenyl guanidine and the like with aromatic sulfonic acids and employ the salt so produced in conjunction with another accelerator, preferably a thiazole accelerator. As examples of the thiazole accelerators which are employed in conjunction with guanidine salts of aromatic sulfonic acids as a mixed accelerator in the vulcanization step wherein a rubber product possessing improved qualities is formed, comprise mercaptobenzothiazole, mercaptololythiazole, mercaptonaphthathiazole, benzothiazyl thiobenzoate, dibenzothiazyl disulfide and the reaction product of substantially one molecular proportion of dimethylol urea and substantially two molecular proportions of mercaptobenzothiazole as disclosed in my prior application Serial No. 12,474, filed March 22, 1935.

The guanidine aromatic sulfonates may be conveniently prepared by dissolving the aromatic sulfonic acid in a convenient quantity of water and the guanidine added thereto preferably with agitation. Thus, diphenyl guanidine p-toluene sulfonate was prepared by dissolving substantially three molecular proportions of p-toluene sulfonic acid (732 parts by weight) in 3000 parts by weight of water, the solution heated to boiling, and substantially three molecular proportions of diphenyl guanidine (633 parts by weight) added thereto with agitation. On cooling 1009 parts by weight of a crystalline product were obtained, which after drying melted at 162°–166° C. Among other members of the class of guanidine aromatic sulfonates which have been prepared in a manner analogous to that above are:

Diphenyl guanidine benzene sulfonate, a solid having a melting point of 179°–184° C.

Di ortho tolyl guanidine benzene sulfonate, a solid having a melting point of 170°–172° C.

Di ortho tolyl guanidine p-toluene sulfonate, a viscous liquid.

Diphenyl guanidine 4-amino benzene sulfonate, a solid having a melting point of 225° C.

Diphenyl guanidine thymol sulfonate, a solid having a melting point of 190°–192° C.

Diphenyl guanidine 4-nitro chlorbenzene-2-sulfonate, a solid having a melting point of 159°–161° C.

As specific embodiments showing the use of the preferred class of compounds rubber stocks were compounded in the well known manner comprising

|  | A | B | C |
|---|---|---|---|
| Pale crepe rubber | 100 | 100 | 100 |
| Zinc oxide | 8 | 8 | 8 |
| Sulfur | 2.5 | 2.5 | 2.5 |
| Stearic acid | 0.5 | 0.5 | 0.5 |
| Mercaptobenzothiazole | 0.75 | 0.5 | 0.5 |
| Diphenyl guanidine p-toluene sulfonate |  | 0.10 |  |
| Diphenyl guanidine benzene sulfonate |  |  | 0.2 |

The stocks so compounded were vulcanized in a press for the times and pressures indicated, and a cured rubber product of the following properties obtained.

Table I

| Stock | Cure | | Modulus of elasticity in lbs./in.$^2$ at elongations of— | | Tensile at break in lbs./in.$^2$ | Ult. elong. percent |
|---|---|---|---|---|---|---|
| | Time mins. | Lbs. steam pressure | 500% | 700% | | |
| A | 30 | 20 | 118 | 341 | 1130 | 915 |
| B | 30 | 20 | 153 | 509 | 1655 | 905 |
| C | 30 | 20 | 136 | 382 | 1250 | 920 |
| A | 45 | 20 | 129 | 707 | 1845 | 900 |
| B | 45 | 20 | 265 | 1030 | 2445 | 865 |
| C | 45 | 20 | 227 | 763 | 2045 | 885 |
| A | 60 | 20 | 258 | 848 | 2170 | 880 |
| B | 60 | 20 | 292 | 1165 | 2685 | 850 |
| C | 60 | 20 | 270 | 973 | 2380 | 875 |
| A | 90 | 20 | 315 | 1008 | 2380 | 860 |
| B | 90 | 20 | 384 | 1460 | 3030 | 830 |
| C | 90 | 20 | 358 | 1250 | 2800 | 850 |

It is readily apparent from the data given in

Table I that the guanidine salts of aromatic sulfonic acids possess highly desirable activating properties.

Rubber stocks were compounded comprising

|  | D | E | F |
|---|---|---|---|
| Pale crepe rubber | 100 | 100 | 100 |
| Zinc oxide | 8 | 8 | 8 |
| Sulfur | 2.5 | 2.5 | 2.5 |
| Stearic acid | 0.5 | 0.5 | 0.5 |
| Benzothiazyl thiobenzoate | 0.75 | 0.5 | 0.5 |
| Diphenyl guanidine p-toluene sulfonate |  | 0.2 |  |
| Diphenyl guanidine benzene sulfonate |  |  | 0.2 |

The stocks so compounded were vulcanized in a press in the well-known manner. The stocks so vulcanized on testing gave the following results.

Table II

| Stock | Cure | | Modulus of elasticity in lbs./in.² at elongations of— | | Tensile at break in lbs./in.² | Ult. elong. percent |
|---|---|---|---|---|---|---|
|  | Time mins. | Lbs. steam pressure | 500% | 700% |  |  |
| D | 45 | 20 | 97 | 217 | 1175 | 1035 |
| E | 45 | 20 | 144 | 390 | 1730 | 965 |
| F | 45 | 20 | 96 | 209 | 692 | 930 |
| D | 60 | 20 | 168 | 385 | 1515 | 960 |
| E | 60 | 20 | 211 | 695 | 2010 | 895 |
| F | 60 | 20 | 203 | 403 | 1245 | 920 |
| D | 90 | 20 | 204 | 643 | 1930 | 895 |
| E | 90 | 20 | 289 | 1058 | 2560 | 865 |
| F | 90 | 20 | 208 | 721 | 2085 | 900 |

As further specific embodiments of the invention rubber stocks were compounded comprising

|  | G | H | I | J | K |
|---|---|---|---|---|---|
| Pale crepe rubber | 100 | 100 | 100 | 100 | 100 |
| Zinc oxide | 8 | 8 | 8 | 8 | 8 |
| Sulfur | 2.5 | 2.5 | 2.5 | 2.5 | 2.5 |
| Stearic acid | 0.5 | 0.5 | 0.5 | 0.5 | 0.5 |
| Reaction product of substantially two molecular proportions of mercaptobenzothiazole and substantially one molecular proportion of dimethylol urea | 0.6 | 0.6 | 0.6 | 0.6 | 0.6 |
| Diphenyl guanidine 4-amino benzene sulfonate |  | 0.2 |  |  |  |
| Diphenyl guanidine thymol sulfonate |  |  | 0.2 |  |  |
| Diphenyl guanidine benzene sulfonate |  |  |  | 0.2 |  |
| Diphenyl guanidine p-toluene sulfonate |  |  |  |  | 0.2 |

The stocks were vulcanized and on testing the cured stocks, the following results were obtained.

Table III

| Stock | Cure | | Modulus of elasticity in lbs./in.² at elongations of— | | Tensile at break in lbs./in.² | Ult. elong. percent |
|---|---|---|---|---|---|---|
|  | Time mins. | Lbs. steam pressure | 500% | 700% |  |  |
| G | 45 | 20 | 187 | 464 | 1305 | 900 |
| H | 45 | 20 | 185 | 463 | 1265 | 800 |
| I | 45 | 20 | 196 | 557 | 1460 | 875 |
| J | 45 | 20 | 143 | 405 | 1300 | 930 |
| K | 45 | 20 | 379 | 1373 | 2445 | 805 |
| G | 60 | 20 | 252 | 805 | 1725 | 860 |
| H | 60 | 20 | 248 | 857 | 1755 | 840 |
| I | 60 | 20 | 258 | 891 | 1730 | 835 |
| J | 60 | 20 | 241 | 712 | 1760 | 880 |
| K | 60 | 20 | 463 | 1760 | 2755 | 780 |
| G | 90 | 20 | 316 | 978 | 2050 | 835 |
| H | 90 | 20 | 378 | 1335 | 2235 | 795 |
| I | 90 | 20 | 370 | 1340 | 2280 | 800 |
| J | 90 | 20 | 323 | 1140 | 2135 | 820 |
| K | 90 | 20 | 544 | 2120 | 2920 | 755 |

Diphenyl guanidine 4-nitro chlorobenzene-2-sulfonate, di ortho tolyl guanidine benzene sulfonate and di ortho tolyl guanidine p-toluene sulfonate have also been employed in conjunction with the reaction product of substantially two molecular proportions of mercaptobenzothiazole and substantially one molecular proportion of dimethylol urea and found to be particularly strong in activating properties.

From the above data it is shown that the guanidine aromatic sulfonates are especially strong activators more particularly when employed in conjunction with thiazole accelerators. Moreover, the preferred class of guanidine salts exert this marked activating property without increasing the tendency to prevulcanize or scorch during the milling operation. In general the preferred class of guanidine salts not only do not increase the scorch of the thiazole accelerator but in fact retard the inherent scorching properties thereof. In order to demonstrate this added property of the guanidine aromatic sulfonates, plasticity data were obtained on the uncured rubber stocks using the Williams plastometer described by Williams, Industrial and Engineering Chemistry, vol. 16, page 362 (1924)—see also Krall, ibid., vol. 16, page 922 (1924). A brief description of the method employed in determining the plasticity figures set forth below follows. Cylinders of two cubic centimeters in volume are cut from uncured rubber compounded stock and placed in a constant temperature oven for the times and at the temperatures indicated. After this initial heating called "preheating", the test pieces of the uncured stock are placed in the Williams plastometer, which is in reality a plastometer press, having a movable upper weighted plate connected to a gauge graduated in 1/100 millimeters so as to measure the distance between the upper and lower plates of the press. The plastometer is maintained in a constant temperature oven held at 70° C. During the plasticity test the preheated test piece remains in the plastometer with the upper movable plate resting on it for exactly 3 minutes, at the end of which period the reading on the gauge is taken, which reading is called the plasticity figure. This plasticity figure is in reality the height of the rubber test cylinder in 1/100 millimeters after the upper movable plate of the press has rested on it for the period of 3 minutes designated.

The plasticity data on the uncured stocks A to K inclusive above are given in Table IV.

Table IV

| Stock | Preheating time in minutes @ 200° F. | Plasticity figure |
|---|---|---|
| A (control) | 360 | 403 |
| B | 360 | 376 |
| C | 360 | 310 |
| D (control) | 420 | 257 |
| E | 420 | 238 |
| F | 420 | 245 |
| G (control) | 300 | 271 |
| H | 360 | 260 |
| I | 360 | 279 |
| J | 360 | 266 |
| K | 300 | 270 |

An examination of the data given in Table IV shows no increase in scorching properties of the compounded rubber stocks containing the guanidine aromatic sulfonates over the control stocks and in most cases marked retarding of scorch is shown.

The preferred class of materials has also been employed in other typical rubber stocks. Thus, a tread stock was compounded comprising

| | Parts |
|---|---|
| Smoked sheet rubber | 100 |
| Carbon black | 45 |
| Zinc oxide | 5 |
| Sulfur | 3 |
| Stearic acid | 3 |
| Pine tar | 2 |
| Reaction product of substantially one molecular proportion of dimethylol urea and substantially two molecular proportions of mercaptobenzothiazole | 0.075 |
| Diphenyl guanidine p-toluene sulfonate | 0.075 |

The stock so compounded was vulcanized and the following results obtained on the vulcanized rubber product.

Table V

| Cure | | Modulus of elasticity in lbs./in.$^2$ at elongations of— | | Tensile at break in lbs./in.$^2$ | Ult. elong. percent |
|---|---|---|---|---|---|
| Time mins. | Lbs. steam pressure | 200% | 400% | | |
| 45 | 30 | 810 | 2150 | 3510 | 560 |
| 60 | 30 | 978 | 2545 | 3930 | 555 |
| 75 | 30 | 1058 | 2750 | 4030 | 520 |
| 90 | 30 | 1060 | 2805 | 4020 | 510 |
| 105 | 30 | 1158 | 3000 | 4030 | 500 |

The results hereinbefore set forth show that a vulcanized rubber product of high quality is obtained by employing the preferred substances in a rubber stock of vulcanizing characteristics.

This invention is not restricted to the use of the particular compounds given in the disclosure as specific examples, nor is it restricted to the use of the preferred class of compounds in the particular rubber mixes hereinbefore described. The invention is limited solely by the claims attached hereto as part of the present specification.

This application is a continuation in part of my prior application Serial No. 490,814, filed October 23, 1930.

What is claimed is:

1. The process of vulcanizing rubber which comprises heating rubber and sulfur in the presence of a diphenyl guanidine salt of benzene sulfonic acid and in addition thereto the reaction product of dimethylol urea and mercaptobenzothiazole.

2. The process of vulcanizing rubber which comprises heating rubber and sulfur in the presence of a diphenyl guanidine salt of p-toluene sulfonic acid and in addition thereto the reaction product of dimethylol urea and mercaptobenzothiazole.

3. The process of vulcanizing rubber which comprises heating rubber and sulfur in the presence of a di ortho tolyl guanidine salt of benzene sulfonic acid and in addition thereto the reaction product of dimethylol urea and mercaptobenzothiazole.

4. The vulcanized rubber product produced by heating a mixture of rubber and sulfur in the presence of a diphenyl guanidine salt of benzene sulfonic acid and in addition thereto the reaction product of dimethylol urea and mercaptobenzothiazole.

5. The vulcanized rubber product produced by heating a mixture of rubber and sulfur in the presence of a diphenyl guanidine salt of p-toluene sulfonic acid and in addition thereto the reaction product of dimethylol urea and mercaptobenzothiazole.

6. The vulcanized rubber product produced by heating a mixture of rubber and sulfur in the presence of a di ortho tolyl guanidine salt of benzene sulfonic acid and in addition thereto the reaction product of dimethylol urea and mercaptobenzothiazole.

7. The process of vulcanizing rubber which comprises heating rubber and sulfur in the presence of a neutral aryl substituted guanidine salt of an aromatic sulfonic acid and in addition thereto a mercaptothiazole accelerator.

8. The vulcanized rubber product produced by heating a mixture of rubber and sulfur in the presence of a neutral aryl substituted guanidine salt of an aromatic sulfonic acid and in addition thereto a mercaptothiazole accelerator.

9. The process of vulcanizing rubber which comprises heating rubber and sulfur in the presence of an aryl substituted guanidine salt of a member of a group consisting in benzene sulfonic acid, 4-amino benzene sulfonic acid, thymol sulfonic acid and p-toluene sulfonic acid and in addition thereto a mercaptobenzothiazole accelerator.

10. The vulcanized rubber product produced by heating a mixture of rubber and sulfur in the presence of an aryl substituted guanidine salt of a member of a group consisting in benzene sulfonic acid, 4-amino benzene sulfonic acid, thymol sulfonic acid and p-toluene sulfonic acid and in addition thereto a mercaptobenzothiazole accelerator.

ROBERT L. SIBLEY.